(12) United States Patent
Yamamoto et al.

(10) Patent No.: US 12,392,273 B2
(45) Date of Patent: Aug. 19, 2025

(54) SUPPORT MEMBER AND CATALYST CONVERTER SUPPORT STRUCTURE

(71) Applicant: Marelli Corporation, Saitama (JP)

(72) Inventors: Takaharu Yamamoto, Saitama (JP); Suguru Yatsuzuka, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 18/280,045

(22) PCT Filed: Dec. 17, 2021

(86) PCT No.: PCT/JP2021/046763
§ 371 (c)(1),
(2) Date: Sep. 1, 2023

(87) PCT Pub. No.: WO2022/185668
PCT Pub. Date: Sep. 9, 2022

(65) Prior Publication Data
US 2024/0077013 A1    Mar. 7, 2024

(30) Foreign Application Priority Data

Mar. 4, 2021   (JP) ................................. 2021-034844

(51) Int. Cl.
*F01N 13/18*       (2010.01)

(52) U.S. Cl.
CPC ................................. *F01N 13/1822* (2013.01)

(58) Field of Classification Search
CPC .................................................. F01N 13/1822
See application file for complete search history.

(56) References Cited

U.S. PATENT DOCUMENTS

| | | | | |
|---|---|---|---|---|
| 2,838,339 A | * | 6/1958 | Schaldenbrand | .... B60G 99/004 296/35.1 |
| 3,261,579 A | * | 7/1966 | Engman | .................. F16L 25/04 180/311 |

(Continued)

FOREIGN PATENT DOCUMENTS

| | | | | |
|---|---|---|---|---|
| CN | 209336481 U | | 9/2019 | |
| EP | 1728986 A1 | * | 12/2006 | ............. B62D 27/04 |

(Continued)

*Primary Examiner* — Eret C McNichols
(74) *Attorney, Agent, or Firm* — Young Basile Hanlon & MacFarlane, P.C.

(57) ABSTRACT

A support member includes: a pair of first support members provided to sandwich and support an attachment portion, one of the first support members being in contact with a vehicle side; and a second support member provided between the pair of first support members, formed separately from the first support members, and configured to support an inner peripheral side of a through hole. An attachment portion is provided at the other end portion of a plate spring member having one end portion fixed to a catalyst converter, and vibration applied to the catalyst converter is absorbed by elastic deformation of the plate spring member. Vibration in a thickness direction of the plate spring member is absorbed by elastic deformation of the first support members, and vibration in a longitudinal direction of the plate spring member is absorbed by elastic deformation of the second support member.

14 Claims, 10 Drawing Sheets

(56) References Cited

U.S. PATENT DOCUMENTS

| | | | | |
|---|---|---|---|---|
| 3,292,887 | A * | 12/1966 | Cassel | F01N 13/1822 248/610 |
| 4,296,907 | A * | 10/1981 | Ishida | F16L 55/035 248/610 |
| 4,339,919 | A * | 7/1982 | Jobling | F01N 13/1822 248/630 |
| 4,494,722 | A | 1/1985 | Kanai et al. | |
| 4,550,795 | A * | 11/1985 | Teshima | B60K 13/04 267/141 |
| 6,412,587 | B1 * | 7/2002 | Weimert | F01N 13/1822 60/322 |
| 6,854,721 | B2 * | 2/2005 | Kato | F16F 7/108 188/380 |
| 8,636,438 | B2 * | 1/2014 | Riekers | F16F 7/1028 403/220 |
| 9,719,403 | B2 * | 8/2017 | Yano | F01N 13/1822 |
| 9,850,800 | B2 * | 12/2017 | Jang | F01N 3/101 |
| 10,329,993 | B2 * | 6/2019 | Fletcher | F01N 13/1816 |
| 12,054,196 | B2 * | 8/2024 | Spurling | F01N 13/1811 |
| 2006/0255516 | A1 | 11/2006 | Dickson et al. | |
| 2006/0266891 | A1 * | 11/2006 | Stammel | B60K 13/04 248/60 |
| 2007/0258754 | A1 | 11/2007 | Riekers et al. | |
| 2013/0256959 | A1 * | 10/2013 | Helferich | F16F 1/44 267/140.2 |
| 2016/0121711 | A1 | 5/2016 | Yano et al. | |
| 2017/0342890 | A1 * | 11/2017 | Torizuka | F01N 13/1822 |

FOREIGN PATENT DOCUMENTS

| | | | |
|---|---|---|---|
| JP | S55-78708 | U | 5/1980 |
| JP | S58-63521 | A | 4/1983 |
| JP | H02-256938 | A | 10/1990 |
| JP | H03-49315 | U | 5/1991 |
| JP | H06-137145 | A | 5/1994 |
| JP | H07-4825 | U | 1/1995 |
| JP | 2001-130443 | A | 5/2001 |
| JP | 2004-153934 | A | 5/2004 |
| JP | 2007-302233 | A | 11/2007 |
| JP | 2016-088159 | A | 5/2016 |
| WO | 2006003713 | A1 | 1/2006 |
| WO | 2008/136203 | A1 | 11/2008 |
| WO | WO-2014167356 | A1 * | 10/2014 ........... F01N 13/008 |

* cited by examiner

SUPPORT MEMBER AND CATALYST CONVERTER SUPPORT STRUCTURE

CROSS-REFERENCE TO RELATED APPLICATIONS

This application is a national phase 371 of International Patent Application Serial No. PCT/JP2021/046763, filed on Dec. 17, 2021, which claims priority to Japanese Patent Application Serial No. 2021-034844, filed on Mar. 4, 2021, the contents of which are incorporated herein by reference.

TECHNICAL FIELD

The present invention relates to a support member and a catalyst converter support structure.

BACKGROUND ART

CN209336481U discloses a vehicle body connection structure of a catalyst converter in which a position determining portion is provided in a vibration damping component in order to prevent the vibration damping component from rotating when the vibration damping component is attached to a vehicle body by tightening a screw.

SUMMARY OF INVENTION

However, in the connection structure in CN209336481U, it is possible to dampen vibration in a fastening direction of the screw, but it is not possible to prevent vibration in a direction perpendicular to the fastening direction of the screw.

An object of the present invention is to enable damping in at least two directions, that is, a first direction corresponding to the fastening direction and a second direction perpendicular to the first direction.

According to an aspect of the present invention, a support member configured to support, on a vehicle, a catalyst converter including an attachment portion having a through hole, the support member includes: a pair of first support members formed of an elastic material and provided to sandwich and support the attachment portion, one of the first support members being in contact with a vehicle side; and a second support member provided between the pair of first support members, formed of an elastic material separately from the first support members, and configured to support an inner peripheral side of the through hole, wherein the attachment portion is provided at the other end portion of a plate spring member having one end portion fixed to the catalyst converter, and vibration applied to the catalyst converter is absorbed by elastic deformation of the plate spring member, vibration in a thickness direction of the plate spring member is absorbed by elastic deformation of the first support members that vertically sandwich the other end portion of the plate spring member, and vibration in a longitudinal direction of the plate spring member is absorbed by elastic deformation of the second support member disposed on the inner peripheral side of the through hole provided at the other end portion of the plate spring member.

In the above aspect, the support member includes the pair of first support members that sandwich and support the attachment portion, and the second support member that is provided between the pair of first support members, that is separated from the first support members, and that supports the inner peripheral side of the through hole. Therefore, by supporting the catalyst converter on the vehicle by the support member, the first support member elastically supports the attachment portion in a first direction, and the second support member elastically supports the attachment portion in a second direction. Therefore, vibration in at least two directions, that is, the first direction and the second direction perpendicular to the first direction can be dampened.

DESCRIPTION OF EMBODIMENTS

Hereinafter, a catalyst converter support structure (hereinafter, simply referred to as a "support structure") 100 according to an embodiment of the present invention will be described with reference to the drawings.

Figure 1:
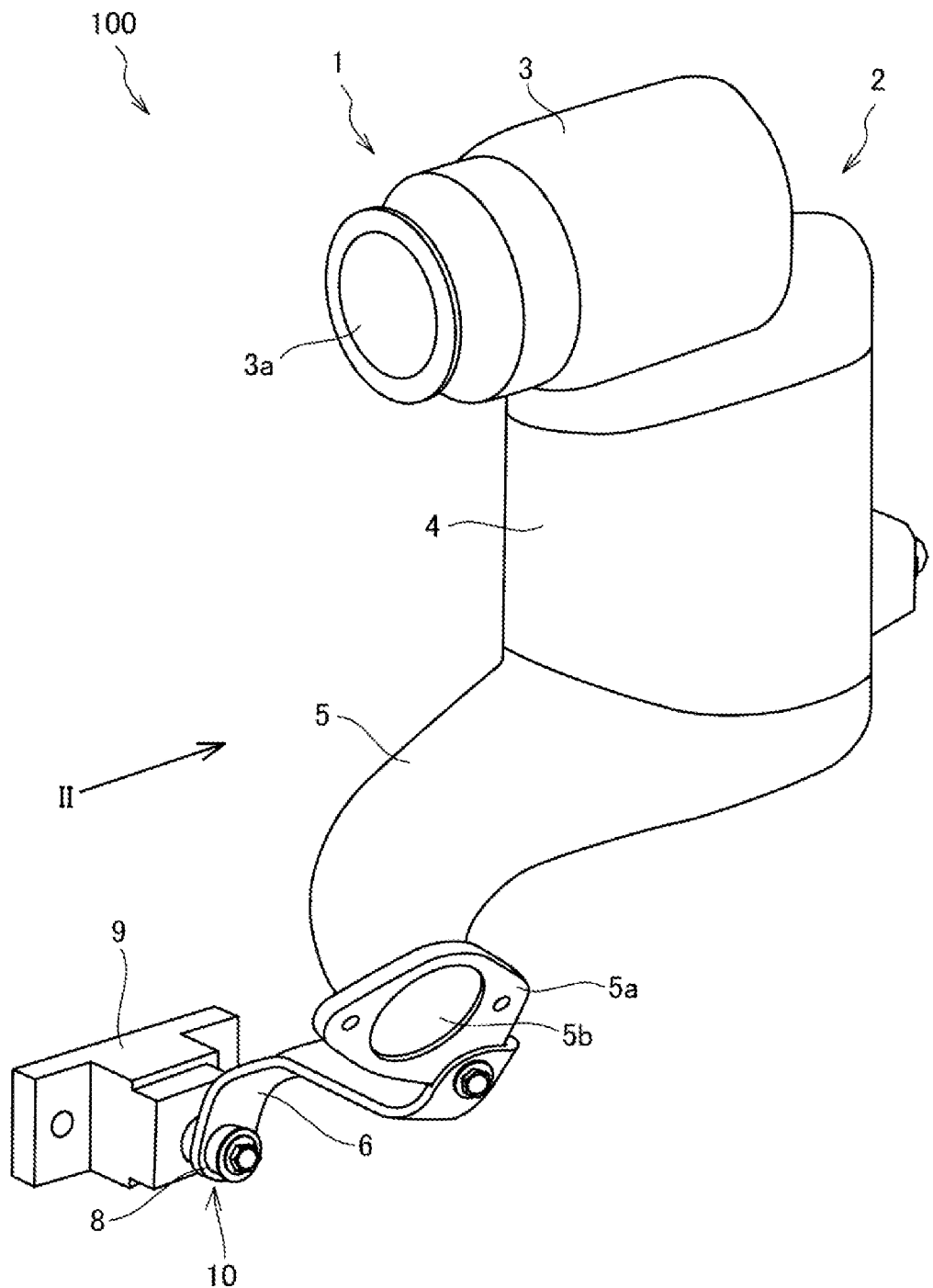
FIG. 1 is a perspective view of a catalyst converter support structure according to an embodiment of the present invention.
Figure 2:
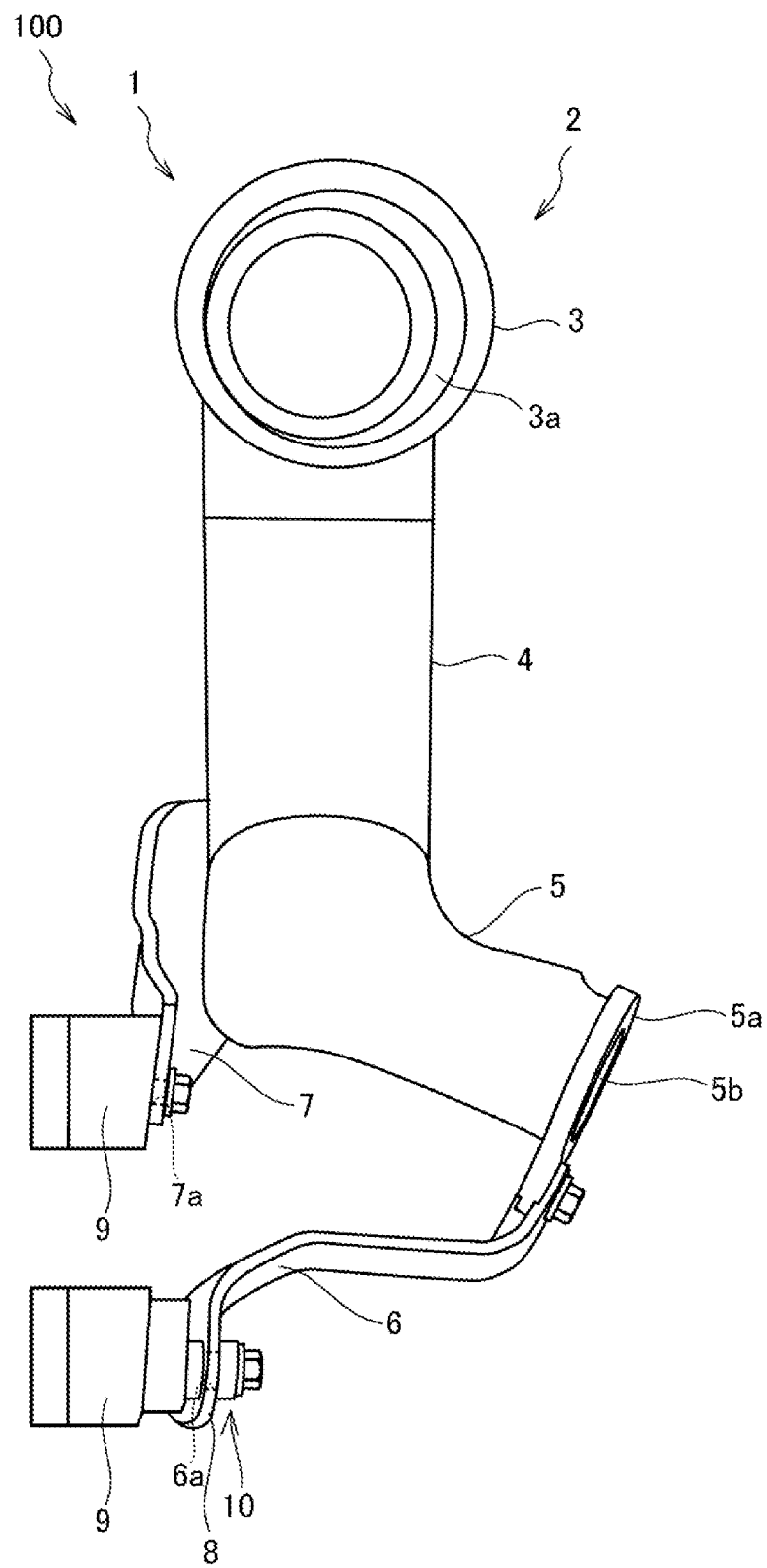
FIG. 2 is a view taken along an arrow II in FIG. 1.

First, an overall configuration of the support structure 100 will be described with reference to FIGS. 1 and 2. FIG. 1 is a perspective view of the support structure 100. FIG. 2 is a view taken along an arrow II in FIG. 1.

The support structure 100 includes a catalyst converter 1 and a support member 10.

The catalyst converter 1 is supported by a vehicle 9. FIGS. 1 and 2 show only a part of the vehicle 9 to which the catalyst converter 1 is attached. The catalyst converter 1 may be supported by an engine (not shown) mounted on the vehicle 9. In this case, it also can be said that the catalyst converter 1 is supported by the vehicle 9.

The catalyst converter 1 oxidizes a hydrocarbon and carbon monoxide contained in exhaust gas discharged from the engine to convert the hydrocarbons and carbon monoxide into carbon dioxide and moisture, and reduces nitrogen oxides and removes fine particulate matter to purify the exhaust gas. The catalyst converter 1 is directly connected downstream of the engine in an exhaust gas flow path. When a supercharger is provided in the engine, the catalyst converter 1 is directly connected downstream of an exhaust outlet portion of the supercharger. Therefore, the catalyst converter 1 receives vibration transmitted from the engine. Further, in the present embodiment, the catalyst converter 1 includes two catalysts to improve purification performance. Further, in the present embodiment, a layout of the catalyst converter 1 has a bent L shape in order to save a space in an engine room. Therefore, the vibration of the entire catalyst converter 1 becomes complicated as compared with, for example, a straight type catalyst converter including only one catalyst.

The catalyst converter 1 includes a case 2 and a plurality of catalysts (not shown) accommodated in the case 2.

The case 2 includes an inlet-side tubular portion 3, an intermediate tubular portion 4, an outlet-side tubular portion 5, and stays 6 and 7 as plate spring members.

The inlet-side tubular portion 3 accommodates a three-way catalyst (TWC) therein. The inlet-side tubular portion 3 has an inlet-side opening 3a into which the exhaust gas flows. The inlet-side tubular portion 3 is configured to bend a flow of the exhaust gas by a predetermined angle (for example, 90°), that is, to form a substantially L-shaped flow path. The inlet-side tubular portion 3 is formed by joining, by welding or the like, two metal plate-shaped members formed by dividing symmetrically along a flow direction of the exhaust gas.

The intermediate tubular portion 4 is joined to the inlet-side tubular portion 3 and accommodates a gasoline particulate filter (GPF) therein. The intermediate tubular portion 4 is formed in an elliptical cylindrical shape by a metal plate-shaped member. An outer peripheral surface of one end of the intermediate tubular portion 4 is joined to an inner peripheral surface of the inlet-side tubular portion 3 by welding or the like. An outer peripheral surface of the other end of the intermediate tubular portion 4 is joined to an inner peripheral surface of the outlet-side tubular portion 5 by welding or the like.

One end of the outlet-side tubular portion 5 is joined to the intermediate tubular portion 4, and the other end thereof is provided with an outlet-side flange 5a that is connected to an exhaust-side conduit (not shown). The outlet-side tubular portion 5 has an outlet-side opening 5b. The outlet-side tubular portion 5 guides the exhaust gas passing through the GPF to an exhaust pipe (not shown) that discharges the exhaust gas to an outside. The outlet-side tubular portion 5 is formed by joining, by welding or the like, two metal plate-shaped members formed by being divided along the flow direction of the exhaust gas.

The stay 6 is formed by pressing a sheet metal material. The stay 6 is attached to the outlet-side flange 5a of the outlet-side tubular portion 5. One end portion of the stay 6 is fixed to the catalyst converter 1. An attachment portion 8 is provided at the other end portion of the stay 6. As shown in FIG. 2, the attachment portion 8 of the stay 6 is provided with a through hole 6a. The through hole 6a is formed in a circular shape. In the through hole 6a, chamfered portions 6b and 6c are formed at both ends in an axial direction of a tip portion inserted into a groove portion 13, which will be described later, of the support member 10 (see FIG. 4).

The stay 7 is formed by pressing a sheet metal material. The stay 7 is attached at a position away from the outlet-side flange 5a of the outlet-side tubular portion 5. As shown in FIG. 2, the stay 7 has a through hole 7a.

The chamfered portions 6b and 6c have a radial length of 0.1 [mm] to 0.5 [mm], that is, C0.1 to C0.5 in the case of C chamfering with a slope angle of 45°. The chamfered portions 6b and 6c may have other shapes such as R chamfering instead of C chamfering.

The stay 6 is supported by the vehicle 9 via the support member 10. The stay 7 is directly supported by the vehicle 9. Instead of supporting only the stay 6 via the support member 10, the stays 6 and 7 may be supported by the vehicle 9 via the support member 10. That is, at least one of the stays 6 and 7 may be supported by the vehicle 9 via the support member 10.

The support member 10 is provided between the stay 6 and the vehicle 9. The support member 10 will be described in detail with reference to FIGS. 3 to 6B.

Here, when the vibration is applied while the vehicle 9 is running, the vibration is transmitted to the catalyst converter 1. Further, when high-temperature exhaust gas flows out from the engine, the case 2 of the catalyst converter 1 may be thermally deformed to change a distance between the through hole 6a and the through hole 7a. Therefore, in the support structure 100, the catalyst converter 1 is supported by the vehicle 9 via the support member 10, thereby preventing the vibration and absorbing the change in distance between the through hole 6a and the through hole 7a due to thermal deformation.

Figure 3:
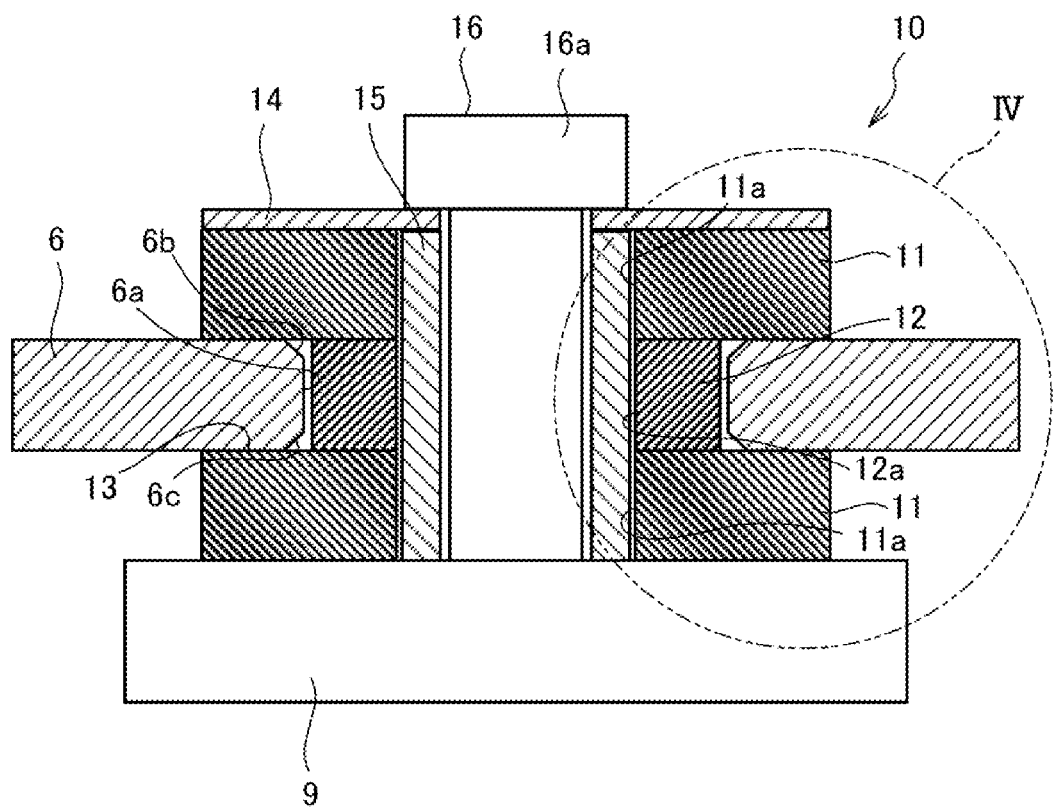
FIG. 3 is a cross-sectional view of a support member.
Figure 4:
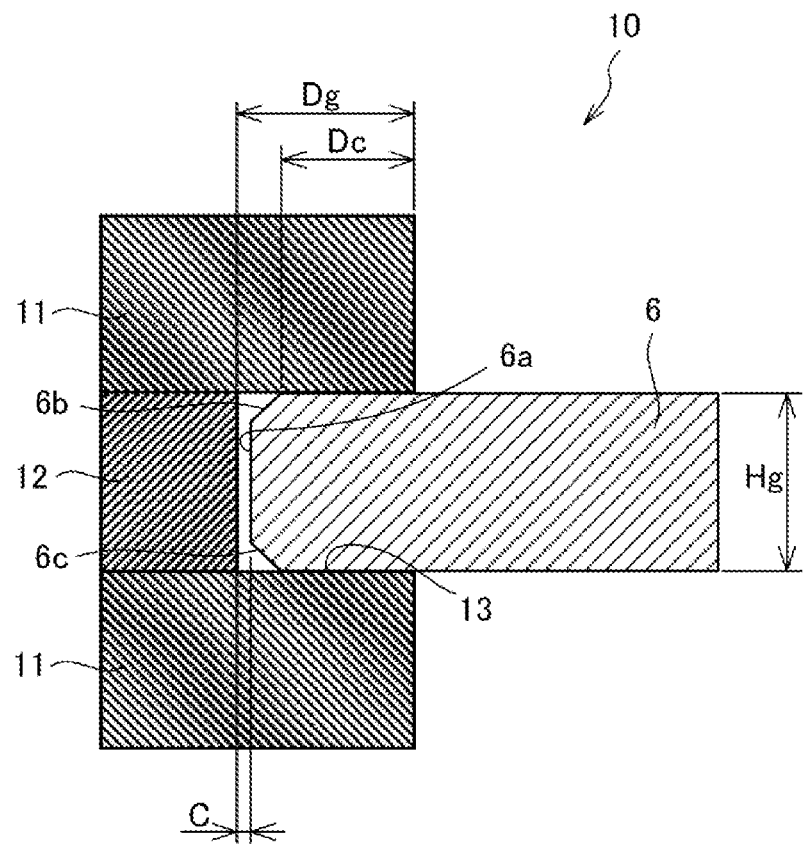
FIG. 4 is an enlarged view of a part IV shown in FIG. 3.
Figure 5A:
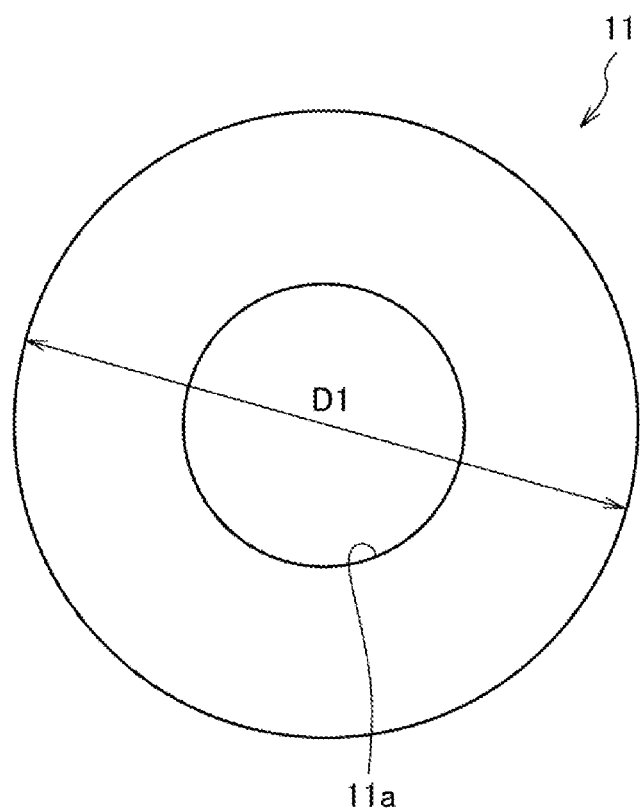
FIG. 5A is a plan view of a first support member.
Figure 5B:
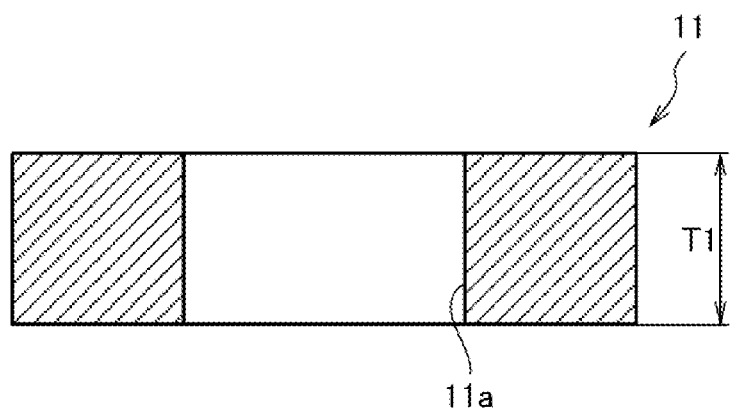
FIG. 5B is a cross-sectional view of a side surface shown in FIG. 5A.
Figure 6A:
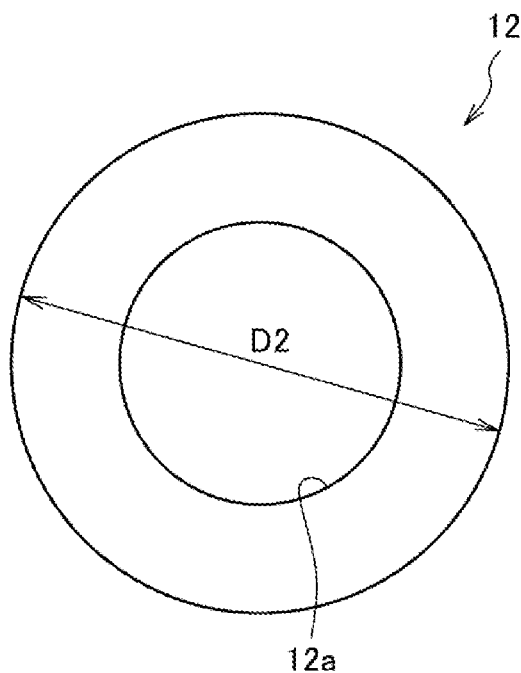
FIG. 6A is a plan view of a second support member.
Figure 6B:
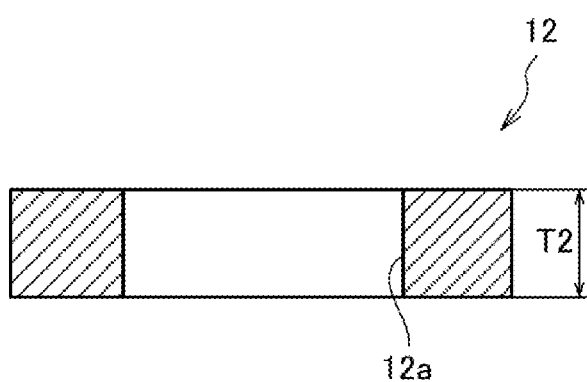
FIG. 6B is a cross-sectional view of a side surface shown in FIG. 6A.

Next, the support member 10 will be described in detail with reference to FIGS. 3 to 6B. FIG. 3 is a cross-sectional view taken along a plane including a center line of the support member 10. FIG. 4 is an enlarged view of a part IV in FIG. 3. FIG. 5A is a plan view of a first support member 11. FIG. 5B is a cross-sectional view of a side surface shown in FIG. 5A. FIG. 6A is a plan view of a second support member 12. FIG. 6B is a cross-sectional view of a side surface shown in FIG. 6A.

As shown in FIG. 3, the support member 10 includes a pair of the first support members 11, the second support member 12, a washer 14, a collar 15, and a bolt 16.

The first support member 11 is formed of an elastic material and has a tubular shape. Here, the first support member 11 is formed in a cylindrical shape, but is not limited to the cylindrical shape as long as the first support member 11 is tubular. The first support members 11 sandwich and support the stay 6 from a thickness direction. One of the first support members 11 is in contact with the vehicle 9. A thickness T1 (see FIG. 5B) of the first support member 11 is, for example, 10.0 [mm]. The first support member 11 has a through hole 11a axially penetrating an inner periphery along a central axis. The stay 6 is an elastically deformable plate spring member and has a function of absorbing the vibration applied to the catalyst converter 1 so as not to be transmitted to a vehicle 9 side.

The second support member 12 is formed of an elastic material and has a tubular shape coaxial with the first support member 11 separately from the first support member 11. Here, the second support member 12 is formed in a cylindrical shape, but is not limited to the cylindrical shape as long as the second support member 12 is tubular. The second support member 12 is provided in a manner of being sandwiched between the pair of first support members 11. The second support member 12 supports an inner periphery of the through hole 6a of the stay 6. A thickness T2 (see FIG. 6B) of the second support member 12 is, for example, 6.0 [mm]. The second support member 12 has a through hole 12a axially penetrating an inner periphery along a central axis. An inner diameter of the through hole 12a is the same as an inner diameter of the through hole 11a. A predetermined gap C is provided between the second support member 12 and an inner peripheral surface of the through hole 6a (see FIG. 4).

The second support member 12 has an outer diameter smaller than that of the first support member 11. Specifically, an outer diameter D1 (see FIG. 5A) of the first support member 11 is, for example, 36.0 [mm], whereas an outer diameter D2 (see FIG. 6A) of the second support member 12 is, for example, 29.0 [mm]. Due to a difference in outer diameter between the first support member 11 and the second support member 12, a groove portion 13 is formed in the support member 10.

The groove portion 13 is formed along an entire outer periphery of the second support member 12. The stay 6 is inserted into the groove portion 13. As shown in FIG. 4, an axial height Hg of the groove portion 13 is substantially the same as or higher than a thickness T2 of the second support member 12 in a state in which the bolt 16 is not fastened and not compressed, and is, for example, 6.0 [mm]. A radial length (depth) Dg of the groove portion 13 is 3.0 [mm] to 6.0 [mm]. Accordingly, even when the chamfered portions 6b and 6c are formed, a radial length Dc of the stay 6 in the groove portion 13 can be maintained at 3.0 [mm] or more. Accordingly, an area of the first support member 11 that is in contact with and supports the stay 6 can be sufficiently ensured, and the stay 6 can be stably supported.

In a state in which the stay 6 is supported by the first support members 11 and the second support member 12, a pair of boundary surfaces at which the first support members 11 and the second support member 12 are in contact with one another in an vertical direction are flush with an upper end surface and a lower end surface of the stay 6 in a plane direction. A state in which the stay 6 is supported by the first support member 11 and the second support member 12 is a fastened state in which the bolt 16 is fastened.

As shown in FIG. 3, the washer 14 abuts on a surface opposite to the stay 6 of one of the pair of first support members 11 which is not in contact with the vehicle 9. The washer 14 is formed in an annular thin plate shape. An outer diameter of the washer 14 is substantially the same as the outer diameter of the first support member 11. An inner diameter of the washer 14 is smaller than inner diameters of the first support member 11 and the second support member 12, and is substantially the same as an inner diameter of the collar 15 to be described later. Therefore, since the washer 14 is in contact with an entire surface of the first support member 11, the pair of the first support members 11 and the second support member 12 can be evenly compressed in the axial direction.

The collar 15 is inserted through the inner peripheries of the first support member 11 and the second support member 12. The collar 15 is formed in a cylindrical shape. An outer diameter of the collar 15 is substantially the same as the inner diameters of the first support member 11 and the second support member 12. An inner diameter of the collar 15 is substantially the same as the inner diameter of the washer 14, and is larger than an outer diameter of the bolt 16 to be described later. One end of the collar 15 in the axial direction is in contact with an axial end portion of the washer 14, and the other end is in contact with the vehicle 9. The collar 15 sets compression amounts of the pair of first support members 11 and the second support member 12 to a specified compression amount.

The bolt 16 is inserted through an inner periphery of the collar 15 and fastened to the vehicle 9. A head portion 16a of the bolt 16 fixes the washer 14 to the vehicle 9. That is, the bolt 16 defines an axial position of the washer 14. By fastening the bolt 16, the compression amounts of the pair of first support members 11 and the second support member 12 can be set to the specified compression amount, and the stays 6 and 7 inserted into the groove portion 13 can be sandwiched and supported between the pair of first support members 11.

Next, an operation of the support structure 100 will be described.

When the vibration is applied while the vehicle 9 is running, the vibration is transmitted to the catalyst converter 1. At this time, first, while the vibration is prevented by the elastic deformation of the stay 6, the pair of first support members 11 sandwich and support the stay 6, and the second support member 12 supports an inner periphery of the through hole 6a of the stay 6. The first support member 11 elastically supports the stay 6 in the axial direction, and the second support member 12 elastically supports the stay 6 in the radial direction perpendicular to the axial direction. Therefore, the vibration transmitted from the vehicle 9 to the catalyst converter 1 can be absorbed stepwise.

When high-temperature exhaust gas flows out from the engine, the case 2 of the catalyst converter 1 may be thermally deformed to change the distance between the through hole 6a and the through hole 7a. At this time, since the second support member 12 supports the inner periphery of the through hole 6a of the stay 6, the change in distance between the through hole 6a and the through hole 7a due to the thermal deformation can be absorbed.

That is, the vibration applied to the catalyst converter 1 is absorbed by the elastic deformation of the stay 6, the vibration in a thickness direction of the stay 6 is absorbed by elastic deformation of the first support members 11 vertically sandwiching the other end portion of the stay 6, and the vibration in a longitudinal direction of the stay 6 is absorbed by elastic deformation of the second support member 12 disposed on an inner peripheral side of the through hole 6a provided at the other end portion of the stay 6.

As described above, the support member 10 includes the pair of first support members 11 that sandwich and support the stay 6, and the second support member 12 that is provided separately from the first support members 11 between the pair of first support members 11 and supports the inner peripheral side of the through hole 6a. Therefore, when the catalyst converter 1 is supported on the vehicle 9 by the support member 10, the first support member 11 elastically supports the stay 6 in the axial direction (first direction), and the second support member 12 elastically supports the stay 6 in the radial direction (second direction). Therefore, the vibration in at least two directions, that is, the axial direction and the radial direction perpendicular to the axial direction can be dampened.

Since the second support member 12 that elastically supports the stay 6 in the radial direction (second direction) is formed separately from the pair of first support members 11, the first support member 11 is not pulled by the stay 6 when the stay 6 moves in the radial direction (second direction) due to the vibration, the elastic deformation, or the like. Accordingly, cracks are less likely to occur in the first support member 11.

Further, the stay 6 is formed with the chamfered portions 6b and 6c, when the stay 6 is pushed into the first support member 11 or the second support member 12 due to deterioration over time or the like, a corner portion does not appear, so that cracks are less likely to occur in the boundary surfaces (surfaces at which the first support members 11 and the second support member 12 are in contact with one another in the vertical direction) of the first support member 11 or the second support member 12.

Further, according to the present embodiment, as described above, the support member 10 enables damping in at least two directions, that is, the axial direction and the radial direction perpendicular to the axial direction. Since the first support member 11 and the second support member 12 are separately formed and combined with each other, it is possible to prevent the support member 10 from being broken by the vibration received from the stay 6, and to improve durability. That is, it is possible to achieve the support structure 100 that achieves both high vibration durability and excellent damping properties.

The support structure 100 according to the present embodiment employs a structure (see FIG. 2) in which the catalyst converter 1 is supported at two positions by using two stays, that is, stays 6 and 7, and the support member 10 is applied to a fastening portion on a lower side shown in FIG. 2. A fastening direction of the bolt 16 at this time is along a radial direction of the catalyst of the catalyst converter 1. Accordingly, vibration of the catalyst in the radial direction in the catalyst converter 1 can be absorbed by the first support member 11, and vibration of the catalyst in a direction intersecting the radial direction, particularly, vibration in a direction perpendicular to the radial direction can be absorbed by the second support member 12. The support member 10 may be applied to a fastening portion on a stay 7 side. In this case, vibration absorption performance can be further enhanced.

Since the support member 10 can be used as a vibration countermeasure against the vibration during running of the vehicle 9, the vibration countermeasure in a structure of the catalyst converter 1 can be reduced. Therefore, a weight of the catalyst converter 1 can be reduced, and a cost can be reduced.

Figure 7:
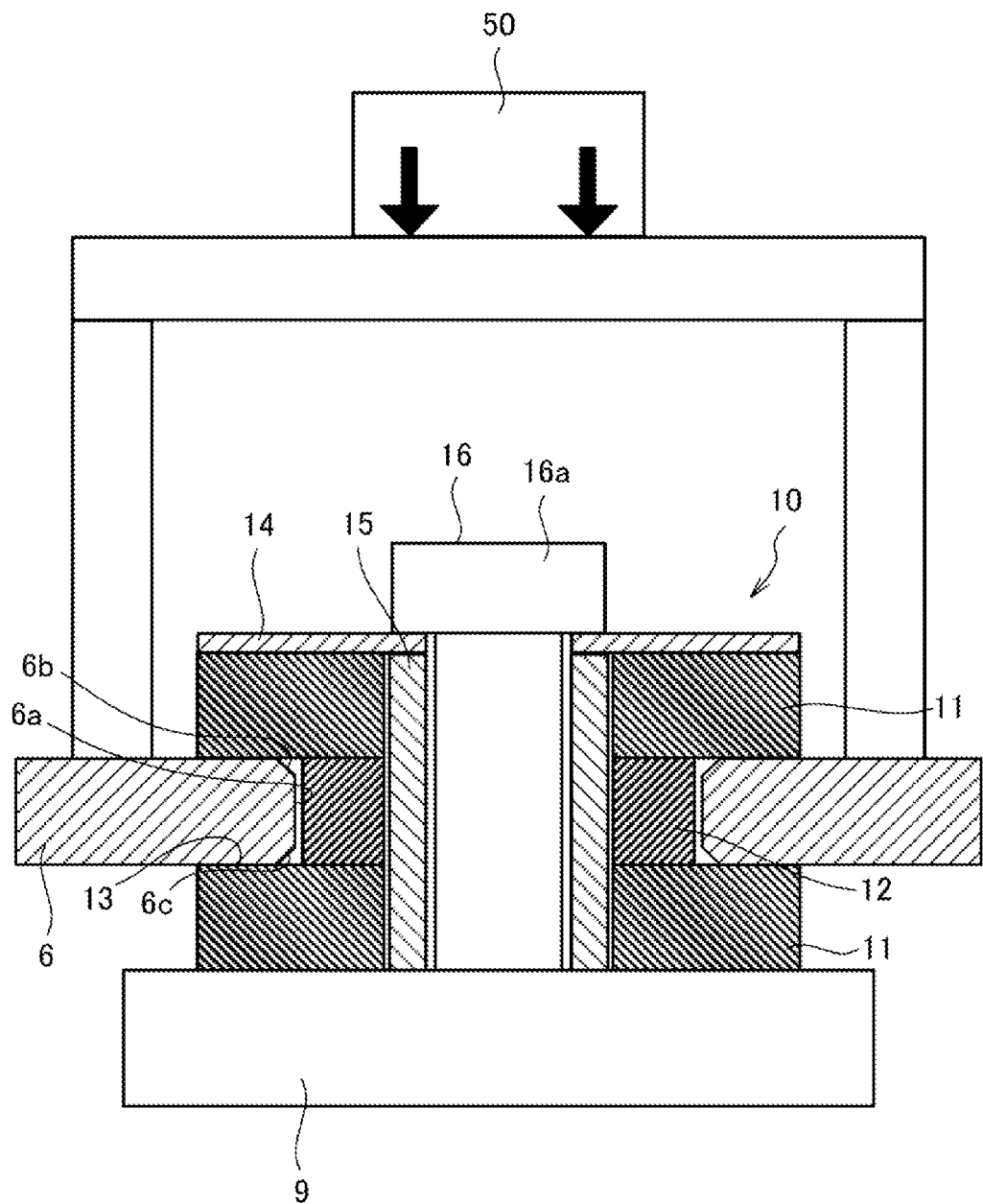
FIG. 7 is a diagram illustrating a load bearing test of the support member.
Figure 8:
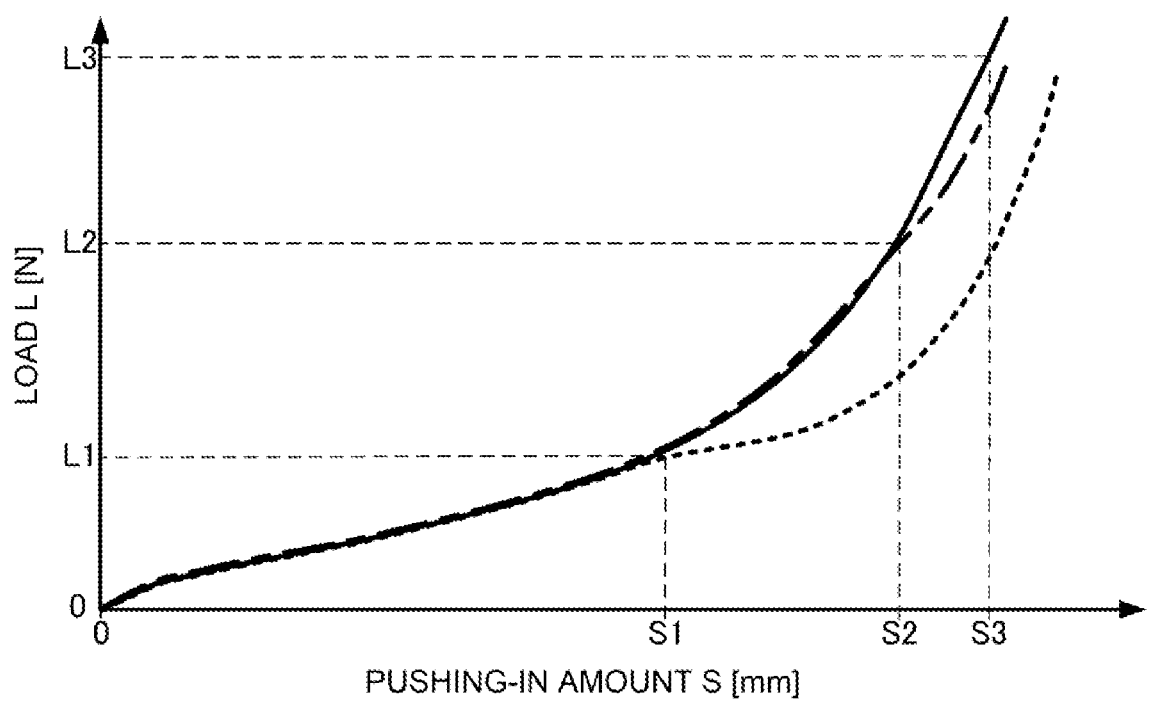
FIG. 8 is a graph illustrating a relationship between a pushing-in amount and a load in the load bearing test of the support member.

Next, sizes of the chamfered portions 6b and 6c of the support member 10 will be described with reference to FIGS. 7 and 8. FIG. 7 is a diagram illustrating a load bearing test of the support member 10. FIG. 8 is a graph illustrating a relationship between a pushing-in amount and a load in the load bearing test of the support member 10. In FIG. 8, a horizontal axis represents a pushing-in amount S [mm], and a vertical axis represents a load L [N].

As shown in FIG. 7, in the load bearing test of the support member 10, a testing machine 50 presses the stay 6 in the axial direction in a state in which the support member 10 supports the stay 6, and a breaking limit of the first support member 11 is checked. Here, load bearing tests are performed using three types of stays, that is, a stay 6 on which the chamfered portions 6b and 6c are not formed as a comparative example, a stay 6 that includes the chamfered portions 6b and 6c each having a radial length of 0.2 [mm] (C0.2), and a stay 6 that includes the chamfered portions 6b and 6c each having a radial length of 0.5 [mm] (C0.5).

In FIG. 8, a test result in a case in which the chamfered portions 6b and 6c are not formed on the stay 6 is indicated by a broken line, a test result in a case in which the chamfered portions 6b and 6c each having the radial length of 0.2 [mm] (C0.2) are formed on the stay 6 is indicated by an alternate long and short dash line, and a test result in a case in which the chamfered portions 6b and 6c each having the radial length of 0.5 [mm] (C0.5) are formed on the stay 6 is indicated by an solid line.

As shown in FIG. 8, the stay 6 on which the chamfered portions 6b and 6c are not formed is broken when the pushing-in amount S is S1 [mm]. The load L at this time is L1 [N].

On the other hand, the stay 6 in which the radial length of the chamfered portions 6b and 6c is 0.2 [mm] (C0.2) is broken when the pushing-in amount S is S2 [mm] larger than S1. The load L at this time is L2 [N] larger than L1.

Further, the stay 6 in which the radial length of the chamfered portions 6b and 6c is 0.5 [mm] (C0.5) is broken when the pushing-in amount S is S3 [mm], which is even larger than S2. The load L at this time is L3 [N], which is even larger than L2.

In this way, by setting the radial length of the chamfered portions 6b and 6c of the stay 6 to 0.2 [mm] to 0.5 [mm] (C0.2 to C0.5), the vibration transmitted from the vehicle 9 to the catalyst converter 1 can be absorbed and the durability of the support member 10 can be improved. Further, by setting the radial length of the chamfered portions 6b and 6c of the stay 6 to 0.3 [mm] to 0.5 [mm] (C0.3 to C0.5), the durability of the support member 10 can be further improved.

Figure 9:
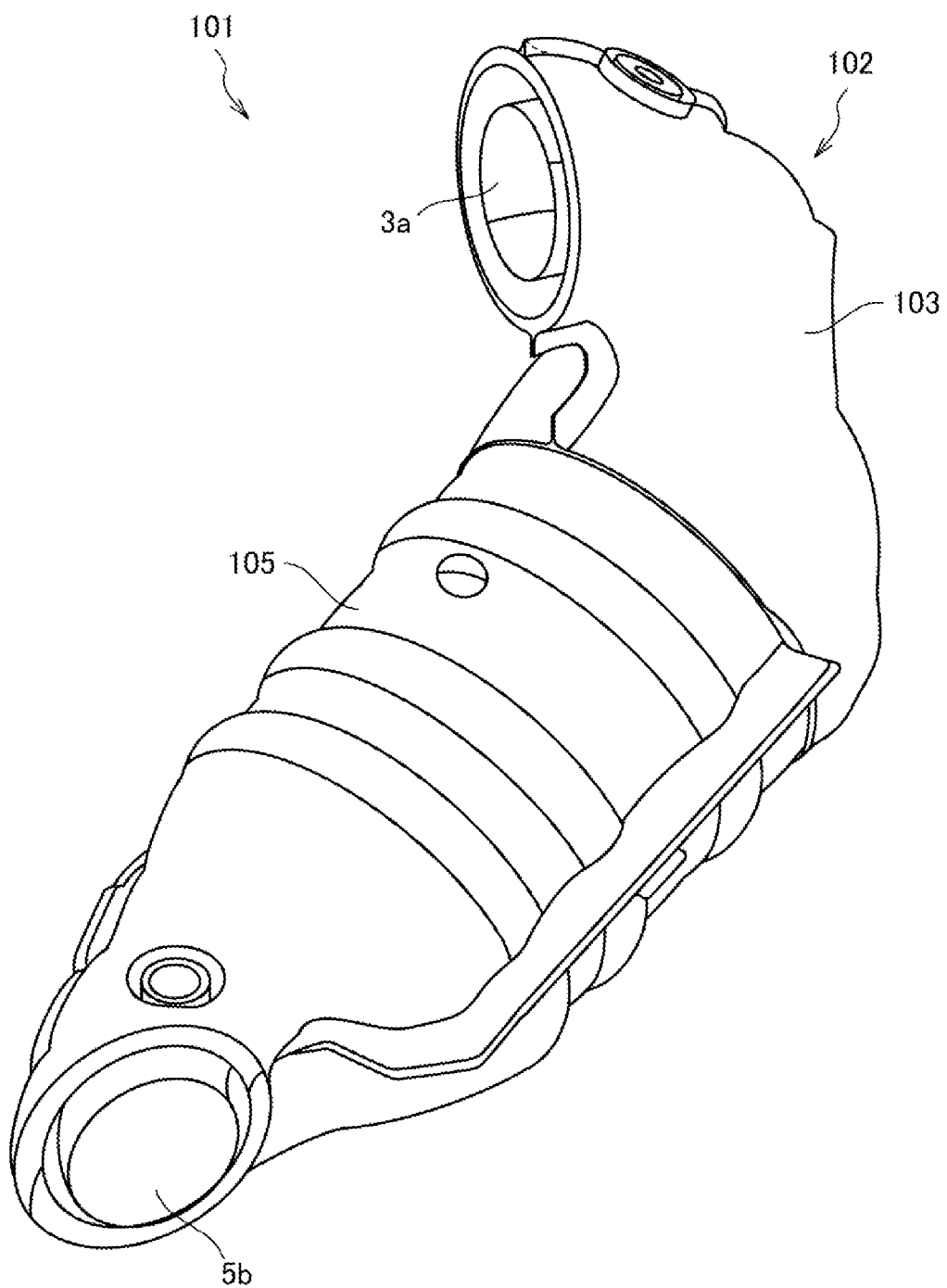
FIG. 9 is a view showing a catalyst converter according to a modification to which the support structure of the present invention is applied.

Next, a catalyst converter 101 according to a modification to which the support structure 100 is applied will be described with reference to FIG. 9. FIG. 9 is a view showing the catalyst converter 101 according to the modification to which the support structure 100 is applied.

The catalyst converter 101 includes a case 102 and at least one catalyst (not shown) accommodated in the case 102. The case 102 is a heat insulation cover that blocks heat released from the catalyst converter 101, and is fixed to a main body of the catalyst converter 101. The case 102 is disposed with a predetermined gap from an outer peripheral surface of the catalyst converter 101. Accordingly, an air layer is formed between the catalyst converter 101 and the case 102, and a heat insulating effect can be improved.

The case 102 is a substantially tubular member in which one end and the other end are bent. The inlet-side opening 3a opens at the one end of the case 102. The outlet-side opening 5b opens at the other end of the case 102. The case 102 includes an inlet-side tubular portion 103, an outlet-side tubular portion 105, and a stay (not shown) as a plate spring member.

The inlet-side tubular portion 103 has the inlet-side opening 3a into which exhaust gas flows. The inlet-side tubular portion 103 is configured to bend a flow of the exhaust gas by a predetermined angle (for example, 150°), that is, to form a substantially U-shaped flow path. The inlet-side tubular portion 103 is formed by joining, by welding or the like, two metal plate-shaped members formed by being divided along a flow direction of the exhaust gas.

One end of the outlet-side tubular portion 105 is joined to the inlet-side tubular portion 103 by welding or the like, and the other end thereof is connected to an exhaust-side conduit (not shown). The outlet-side tubular portion 105 has the outlet-side opening 5b. The outlet-side tubular portion 105 guides the exhaust gas that has passed through the catalyst to an exhaust pipe (not shown) that discharges the exhaust gas to an outside. The outlet-side tubular portion 105 is formed by joining, by welding or the like, two metal plate-shaped members formed by being divided along the flow direction of the exhaust gas.

Compared to a catalyst converter not covered with the case 102, the catalyst converter 101 covered with such a case 102 vibrates more complicatedly due to vibration received from an engine, but when the support structure 100 according to the present embodiment is applied, that is, when the catalyst converter 101 is supported on the vehicle 9 via the support member 10, it is possible to damp vibration in two directions, that is, an axial direction and a radial direction perpendicular to the axial direction.

Figure 10:
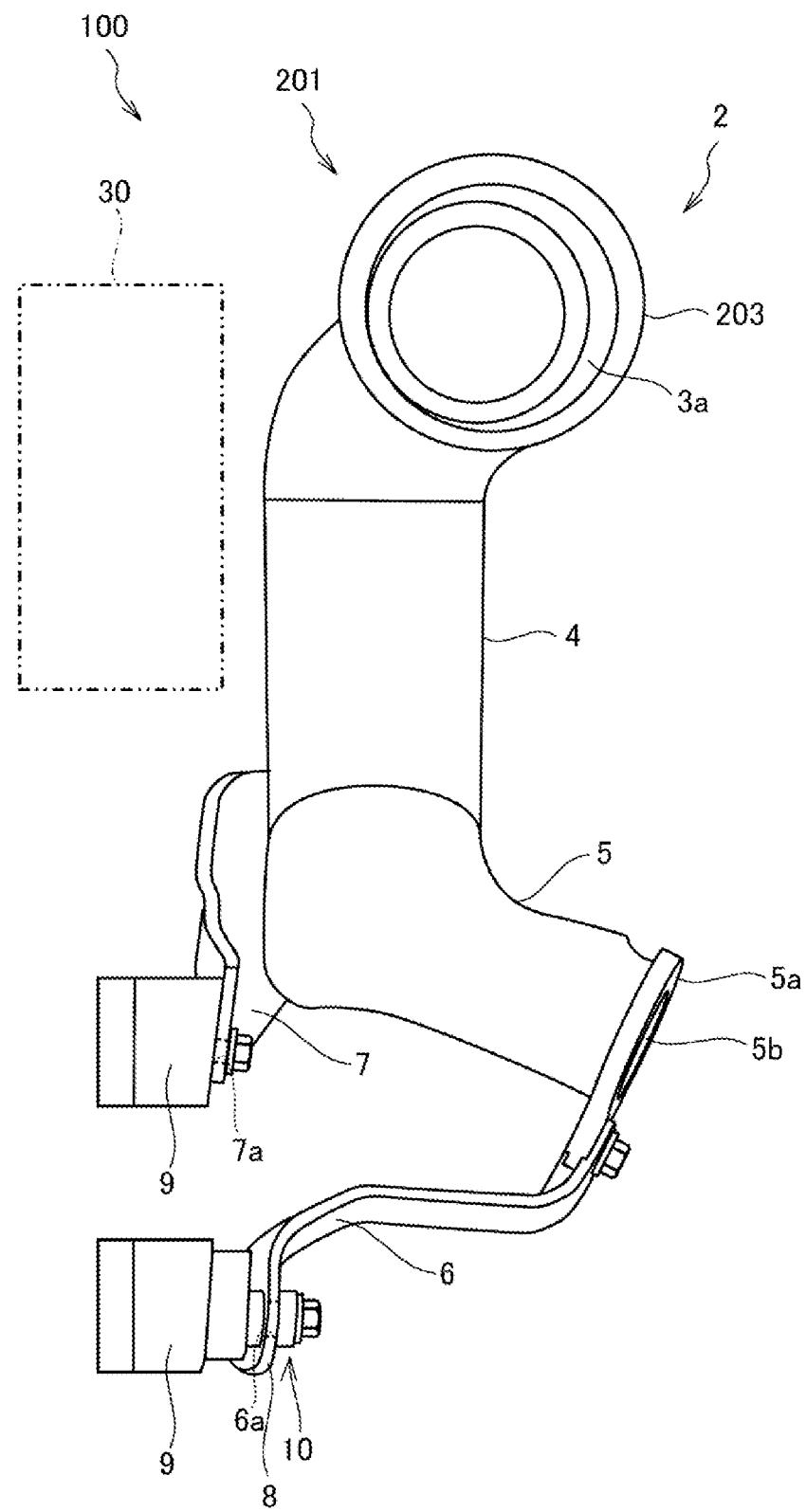
FIG. 10 is a view showing a catalyst converter according to another modification to which the support structure of the present invention is applied.

Next, a catalyst converter 201 according to another modification to which the support structure 100 is applied will be described with reference to FIG. 10. FIG. 10 is a view showing the catalyst converter 201 according to the other modification to which the support structure 100 is applied.

The catalyst converter 201 includes the case 2 and a plurality of catalysts (not shown) accommodated in the case 2.

The case 2 includes an inlet-side tubular portion 203, the intermediate tubular portion 4, the outlet-side tubular portion 5, and the stays 6 and 7 as plate spring members.

The inlet-side tubular portion 203 accommodates a three-way catalyst (TWC) therein. The inlet-side tubular portion 203 has the inlet-side opening 3a into which exhaust gas flows. The inlet-side tubular portion 203 is configured to bend a flow of the exhaust gas by a predetermined angle (for example, 90°), that is, to forma substantially L-shaped flow path. The inlet-side tubular portion 203 is formed by joining, by welding or the like, two metal plate-shaped members formed by dividing symmetrically along a flow direction of the exhaust gas.

In such a catalyst converter 201, although not shown, a first catalyst and a second catalyst are accommodated in the case 2, and specifically, when a direction of the exhaust gas flowing through the first catalyst is defined as a first direction, the first catalyst that purifies the exhaust gas flowing along the first direction and the second catalyst that purifies the exhaust gas that has passed through the first catalyst and flows along a second direction intersecting the first direction are disposed.

Further, in the catalyst converter 201 shown in FIG. 10, at least one of the first catalyst and the second catalyst is disposed away from the other catalyst in a third direction orthogonal to the first direction and the second direction. Here, a portion accommodating the first catalyst, which is an upstream portion of the catalyst converter 201, is shifted and disposed in a direction away from an engine as compared with a portion accommodating the second catalyst, which is a downstream portion thereof. At this time, an EGR device 30, which will be described later, is disposed in a gap sandwiched between the downstream portion of the catalyst converter 201 which accommodates the second catalyst and an engine main body, and the EGR device 30 is connected to an exhaust pipe forming a flow path of the exhaust gas passing through the second catalyst in the catalyst converter 201.

As described above, since the catalyst converter 201 shown in FIG. 10 has a complicated overall shape, vibration received from the engine is also transmitted in a complicated manner. Therefore, by using the support member 10 according to the present embodiment, it is possible to effectively prevent the complicated vibration in the catalyst converter 201.

As shown in FIG. 10, the inlet-side tubular portion 203 is offset from a central axis of the intermediate tubular portion 4 to a side opposite to the exhaust gas recirculation (EGR) device 30 in order to prevent interference with the EGR device 30. In this case, the EGR device 30 is disposed between the engine and the catalyst converter 201.

Similarly, in the case in which such a catalyst converter 201 is supported by the vehicle 9 via the support member 10, it is also possible to dampen the vibration in at least two directions, that is, an axis direction and a radial direction perpendicular to the axis direction. Even when the heat insulation cover shown in FIG. 9 described above is applied to such a catalyst converter 201, by applying the support structure 100 according to the present embodiment, the damping in at least two directions can be achieved.

According to the above embodiments, the following effects are achieved.

The support member 10 configured to support, on the vehicle 9, the catalyst converter 1, 101, 201 including the stay 6 having the through hole 6a includes: the pair of first support members 11 that are formed of the elastic material and provided so as to sandwich and support the stay 6, one of the first support members 11 being in contact with the vehicle 9 side; and a second support member 12 that is provided between the pair of first support members 11, is formed of an elastic material separately from the first support members 11, and supports the inner peripheral side of the through hole 6a.

In this configuration, the support member 10 includes the pair of first support members 11 that sandwich and support the stay 6, and the second support member 12 that is provided separately from the first support members 11 between the pair of first support members 11 and supports the inner peripheral side of the through hole 6a. Therefore, when the catalyst converter 1, 101, 201 is supported on the vehicle 9 by the support member 10, the first support member 11 elastically supports the stay 6 in the axial direction (first direction), and the second support member 12 elastically supports the stay 6 in the radial direction (second direction). Therefore, the vibration in at least two directions, that is, the axial direction and the radial direction perpendicular to the axial direction can be dampened.

In the support structure 100 including the catalyst converter 1, 101, 201 and the support member 10 that supports the catalyst converter 1, 101, 201 on the vehicle 9, the catalyst converter 1, 101, 201 includes the stay 6 having the through hole 6a, the support member 10 has the groove portion 13 which is formed in the entire outer periphery and into which the stay 6 is inserted, and the stay 6 has the chamfered portions 6b and 6c at the tip portion inserted into the groove portion 13.

In this configuration, the support member 10 has the groove portion 13 into which the stay 6 is inserted. Therefore, by supporting the catalyst converter 1, 101, 201 on the vehicle 9 by the support member 10, the stay 6 is elastically supported in the axial direction (first direction) of the groove portion 13, and the stay 6 is elastically supported in the radial direction (second direction) of the groove portion 13. Therefore, the vibration in at least two directions, that is, the axial direction and the radial direction perpendicular to the axial direction can be dampened.

Since the second support member 12 that elastically supports the stay 6 in the radial direction (second direction) is formed separately from the pair of first support members 11, the first support member 11 is not pulled by the stay 6 when the stay 6 moves in the radial direction (second direction) due to the vibration, the elastic deformation, or the like. Accordingly, the cracks are less likely to occur in the first support member 11.

Further, the stay 6 is formed with the chamfered portions 6b and 6c, when the stay 6 is pushed into the first support member 11 or the second support member 12 due to the deterioration over time or the like, the corner portion does not appear, so that the cracks are less likely to occur in the first support member 11 or the second support member 12.

Although the embodiments of the present invention have been described above, the above-mentioned embodiments are merely a part of application examples of the present invention, and do not mean that the technical scope of the present invention is limited to the specific configurations of the above-mentioned embodiments.

For example, the first support member 11 and the second support member 12 may be formed of the same elastic material or different elastic materials. In this case, an elastic force of the first support member 11 and an elastic force of the second support member 12 may be the same elastic force or different elastic forces. For example, the elastic force in a vibration input direction received by the first support member 11 from the stay 6 and the elastic force in the vibration input direction received by the second support member 12 from the stay 6 may be the same, or different elastic forces may be applied in respective vibration directions received from the stay 6. As described above, in the present embodiment, since the first support member 11 and the second support member 12 are separately formed, it is possible to prevent breakage of the support structure 100, that is, to ensure high vibration durability, and to more effectively absorb vibration input from the catalyst converter 1 which is complicated by the support structure 100.

For example, the predetermined gap (clearance) C may be provided between the second support member 12 and an end portion of the stay 6 in the state in which the pair of first support members 11 and the stay 6 are vertically sandwiched (see FIG. 4). In this case, while preventing the vibration input from the stay 6 to a second support member 12 side due to a friction between the first support member 11 and the stay 6, the vibration can be prevented step by step by bringing the end portion of the stay 6 and the second support member 12 into contact with each other when the stay 6 vibrates greatly together with the first support member 11. Accordingly, relatively small vibration can be absorbed only by the first support member 11, and relatively large vibration can be absorbed by both the first support member 11 and the second support member 12. Accordingly, not only can impact absorption when the stay 6 slides in the plane direction (longitudinal direction) be more effectively performed, but also the durability of the support structure 100 can be improved, and by providing the predetermined gap (clearance) C between the second support member 12 and the end portion of the stay 6, assembly when the stay 6 is supported and fixed (at the time of fastening) is also easily performed.

Furthermore, in the embodiments described above, although the structure in which the stay 6 is provided with the chamfered portions 6b and 6c is described as an example, the present embodiment can achieve a high vibration absorption effect and high durability even for the stay 6 that is not provided with the chamfered portions 6b and 6c.

The present application claims priority under Japanese Patent Application No. 2021-034844 filed to the Japan Patent Office on Mar. 4, 2021, and an entire content of this application is incorporated herein by reference.

The invention claimed is:

1. A support member configured to support, on a vehicle, a catalyst converter including an attachment portion having a through hole, the support member comprising:
   a pair of first support members formed of an elastic material and provided to sandwich and support the attachment portion, one of the first support members being in contact with a vehicle side; and
   a second support member provided between the pair of first support members, formed of an elastic material separately from the first support members, and configured to support an inner peripheral side of the through hole, wherein
   the attachment portion is provided at an end portion of a plate spring member having another end portion fixed to the catalyst converter, and
   vibration applied to the catalyst converter is absorbed by elastic deformation of the plate spring member, vibration in a thickness direction of the plate spring member is absorbed by elastic deformation of the first support members that vertically sandwich the end portion of the plate spring member, and vibration in a longitudinal direction of the plate spring member is absorbed by elastic deformation of the second support member disposed on the inner peripheral side of the through hole provided at the end portion of the plate spring member, and
   a predetermined gap is provided between the second support member and an inner peripheral surface of the through hole.

2. The support member according to claim 1, wherein in a state in which the plate spring member is supported by the first support members and the second support member, a pair of boundary surfaces at which the first support members and the second support member are in contact with one another in a vertical direction are flush with an upper end surface and a lower end surface of the plate spring member in a plane direction.

3. The support member according to claim 1, wherein the first support members and the second support member are tubular,
   the second support member has an outer diameter smaller than that of the first support members, and
   the second support member is sandwiched between the pair of first support members and fixed coaxially with the pair of first support members.

4. The support member according to claim 3, further comprising:
   a washer that is in contact with a surface of one of the pair of first support members which is not in contact with the vehicle, the surface being opposite to the attachment portion;
   a collar that passes through inner peripheries of the first support members and the second support member and is in contact with an axial end portion of the washer; and
   a bolt that passes through an inner periphery of the collar and fixes the washer to the vehicle.

5. A catalyst converter support structure comprising:
   a catalyst converter; and
   a support member configured to support the catalyst converter on a vehicle, wherein the catalyst converter includes an attachment portion having a through hole, the support member includes
      a pair of first support members formed of an elastic material and provided to sandwich and support the attachment portion, one of the first support members being in contact with a vehicle side, and
      a second support member provided between the pair of first support members, formed of an elastic material separately from the first support members, and configured to support an inner peripheral side of the through hole,
   the support member has a groove portion which is formed in an entire outer periphery thereof and into which the attachment portion is inserted,
   the attachment portion is provided at an end portion of a plate spring member having another end portion fixed to the catalyst converter,
   vibration applied to the catalyst converter is absorbed by elastic deformation of the plate spring member, vibration in a thickness direction of the plate spring member is absorbed by elastic deformation of the first support members that vertically sandwich the end portion of the plate spring member, and vibration in a longitudinal direction of the plate spring member is absorbed by elastic deformation of the second support member disposed on the inner peripheral side of the through hole provided at the end portion of the plate spring member, and a predetermined gap is provided between the second support member and an inner peripheral surface of the through hole.

6. The catalyst converter support structure according to claim 5, wherein in a state in which the plate spring member is supported by the first support members and the second support member, a pair of boundary surfaces at which the first support members and the second support member are in contact with one another in a vertical direction are flush with an upper end surface and a lower end surface of the plate spring member in a plane direction.

7. A catalyst converter support structure comprising:

a catalyst converter; and a support member configured to support the catalyst converter on a vehicle, wherein the catalyst converter includes an attachment portion having a through hole, the support member has a groove portion which is formed in an entire outer periphery thereof and into which the attachment portion is inserted, the attachment portion has a chamfered portion at a tip portion inserted into the groove portion, the support member includes a pair of first support members formed of an elastic material and provided to sandwich and support the attachment portion, one of the first support members being in contact with a vehicle side, and a second support member provided between the pair of first support members, formed of an elastic material separately from the first support members, and configured to support an inner periphery side of the through hole, the first support members and the second support member are coaxial and tubular, the groove portion is formed in an entire outer periphery of the second support member, the attachment portion is provided at an end portion of a plate spring member having another end portion fixed to the catalyst converter, and vibration applied to the catalyst converter is absorbed by elastic deformation of the plate spring member, vibration in a thickness direction of the plate spring member is absorbed by elastic deformation of the first support members that vertically sandwich the end portion of the plate spring member, and vibration in a longitudinal direction of the plate spring member is absorbed by elastic deformation of the second support member disposed on an inner peripheral side of the through hole provided at the end portion of the plate spring member.

8. The catalyst converter support structure according to claim 7, wherein a radial length of the attachment portion in the groove portion is 3.0 mm or more.

9. The catalyst converter support structure according to claim 7, wherein a radial length of the groove portion is 3.0 mm to 6.0 mm, and a radial length of the chamfered portion is 0.1 mm to 0.5 mm.

10. The catalyst converter support structure according to claim 9, wherein the radial length of the chamfered portion is 0.2 mm to 0.5 mm.

11. The catalyst converter support structure according to claim 10, wherein the radial length of the chamfered portion is 0.3 mm to 0.5 mm.

12. The catalyst converter support structure according to claim 7, wherein the support member further includes a washer that is in contact with a surface of the other one of the pair of first support members which is not in contact with the vehicle, the surface being opposite to the attachment portion, a collar that passes through inner peripheries of the first support members and the second support member and is in contact with an axial end portion of the washer, and a bolt that passes through an inner periphery of the collar and fixes the washer to the vehicle.

13. The catalyst converter support structure according to claim 7, wherein in a state in which the attachment portion is supported by the first support members and the second support member, a pair of boundary surfaces at which the first support members and the second support member are in contact with one another in a vertical direction are flush with an upper end surface and a lower end surface of the attachment portion in a plane direction.

14. The catalyst converter support structure according to claim 7, wherein a predetermined gap is provided between the second support member and an inner peripheral surface of the through hole.

\* \* \* \* \*